United States Patent [19]
Drerup et al.

[11] Patent Number: 5,377,331
[45] Date of Patent: Dec. 27, 1994

[54] CONVERTING A CENTRAL ARBITER TO A SLAVE ARBITER FOR INTERCONNECTED SYSTEMS

[75] Inventors: Bernard C. Drerup; James C. Peterson, both of Austin, Tex.

[73] Assignee: International Business Machines Corporation, Armonk, N.Y.

[21] Appl. No.: 857,880

[22] Filed: Mar. 26, 1992

[51] Int. Cl.$^5$ .......................................... G06F 13/368
[52] U.S. Cl. .............................. 395/325; 364/DIG. 1; 364/240.2; 364/240.4; 364/242.92; 364/230.4; 364/260
[58] Field of Search ..................... 395/325, 275, 725

[56] References Cited

U.S. PATENT DOCUMENTS

| | | | |
|---|---|---|---|
| 4,257,099 | 3/1981 | Appelt | 395/325 |
| 4,641,266 | 2/1987 | Walsh | 395/325 |
| 4,734,909 | 3/1988 | Bennett et al. | 370/85 |
| 4,787,032 | 11/1988 | Culley | 395/725 |
| 4,817,037 | 3/1989 | Hoffman et al. | 395/325 |
| 4,982,321 | 1/1991 | Pantry et al. | 395/325 |
| 5,001,624 | 3/1991 | Hoffman et al. | 395/375 |
| 5,005,151 | 4/1991 | Kurkowski | 395/325 |
| 5,083,260 | 1/1992 | Tsuchiya | 395/325 |
| 5,088,028 | 2/1992 | Theus et al. | 395/325 |

OTHER PUBLICATIONS

IBM TDB, "Bus Arbitration Selection Mechanism", vol. 25, No. 11A, Apr. 1983, p. 5621.
IBM TDB, "High-Speed Processor Bus Arbitration", vol. 28, No. 12, May 1986, pp. 5329-5333.
IBM TDB, "Method to Provide Coprocessor Access to System Memory in a Virtual Memory System", vol. 29, No. 4, Sep. 1986.
IBM TDB, "Shared Direct Memory Access in a Virtual Memory System Having an I/O Bus", vol. 29, No. 4, Sep. 1986, p. 1616.
IBM TDB, "Interchip Arbitration Design", vol. 29, No. 3, Aug. 1986, pp. 1398-1400.
IBM TDB, "Shared Master/Slave Device", vol. 30, No. 7, Dec. 1987, pp. 420-422.
IBM TDB, "Dynamic Arbitration Level Assignment for a Direct Memory Access Subsystem", vol. 31, No. 3, Aug. 1988, pp. 32-36.
IBM TDB, "High Speed Parallel Bus Arbitration", vol. 32, No. 5B, Oct. 1989, pp. 409-411.
IBM TDB, "Two-Level Internal Bus Arbitration for the System IO Bus", vol. 32, No. 5A, Oct. 1989, pp. 225-228.
IBM TDB, "Dual Master Bus Isolator", vol. 32, No. 3B, Aug. 1989, pp. 206-208.
IBM TDB, "Intellegent Bus Controller—DMA Slave Communication", vol. 33, No. 5, Oct. 1990 pp. 112-113.
IBM TDB, "Movable Bus Arbiter and Shared Bus Address", vol. 32, No. 8B, Jan. 1990, pp. 177-179.
IBM TDB, "Improvement on Parallel Arbitration Scheme", vol. 33, No. 10B, Mar. 1991, pp. 446-447.

*Primary Examiner*—Debra A. Chun
*Attorney, Agent, or Firm*—Mark E. McBurney

[57] ABSTRACT

A method and apparatus are disclosed for allowing at least one computer subsystem, having a central arbiter, to be interconnected with a host system also including a central arbiter. Conversion logic is added to each computer subsystem desired to be interconnected to the host. The conversion logic is positioned between the arbitration buses of the host system and the subsystem and includes two requesting arbiters, one of which arbitrates for the host system arbitration bus, and the other which arbitrates for the subsystem arbitration bus. At the default state, the conversion logic has successfully arbitrated for, and is maintaining control of the subsystem bus. After a request from a subsystem device for access to the host bus, the conversion logic arbitrates for control of the host bus. When control of the host bus is awarded to the conversion logic, control of the subsystem bus is released and the requesting subsystem device can transfer data between the subsystem and host.

9 Claims, 8 Drawing Sheets

CONVERTING A CENTRAL ARBITER TO A SLAVE ARBITER FOR INTERCONNECTED SYSTEMS

BACKGROUND OF THE INVENTION

1. Field of the Invention

The present invention generally relates to overcoming problems encountered when interconnecting plural computers on a single bus. Specifically, a method and apparatus are provided which allow plural computers, each including a central arbiter for determining access and priority to their internal system bus, to be interconnected and share a common bus.

2. Background of Related Art

Interconnected computer systems are becoming increasingly popular due to the increase in available processing power and other economies of scale. It is often desirable to interconnect several substantially complete computer systems together on the same bus. For example, a personal computer such as a PS/2, manufactured by the IBM Corp., may be designated as the host computer with other PS/2 computers or workstations, such as the RISC System/6000 (PS/2 and RISC System/6000 are trademarks of IBM) as the interconnected subsystem. Of course, the RISC System/6000 machine could also be designated as the host system with other RISC System/6000 computers or PS/2 computers configured as the subsystems. Regardless of the desired configuration, each computer (whether a stand alone unit, or a computer system on a board) will have a central arbiter that determines which of the busmaster devices, e.g. central processing unit (CPU), direct memory access (DMA), small computer system interface (SCSI), or the like, can access the slave devices, such as the memory, floppy disk, serial port, I/O peripherals, or the like, through the system bus.

Referring to FIG. 1, a typical configuration is shown wherein a central arbiter 1 is used to arbitrate access to a Micro Channel bus 11 (Micro Channel is a trademark of IBM Corp.). Busmaster devices 3,5,7 each include a request arbiter with an assigned priority value. SCSI busmaster 7 controls a hard disk 9 and DMA 5 is a direct memory access controller. Slave devices 13, 15, 17, 19 will transfer information between a corresponding busmaster device when the request arbiter in the busmaster device successfully arbitrates for access to the bus. For example, it may be desired for information to be transferred from hard disk 9 to the memory 13. The SCSI busmaster 7 will have to arbitrate for access to bus 11 in order to complete the transfer of data.

Several types of arbitration schemes exist and have been used to access the bus for a busmaster device. IBM TDB "High-Speed Processor Bus Arbitration" shows a typical arbitration scheme which uses a signal to control the timing of when a new busmaster (the one that has received a Bus_Grant) can take control of the bus. IBM TDB "Interchip Arbitration Design" describes an interchip arbitration arrangement which uses rotating priority values and includes a "look ahead" feature to permit fast arbitration. IBM TDB "Improvement on Parallel Arbitration Scheme" discusses an arbitration scheme wherein ownership of the bus is determined by a distributed priority scheme, but the current bus owner remains owner until a request from another device is present. The current owner then defines a competition period for the bus which determines the new owner of the bus. U.S. Pat. No. 4,734,909 describes a bus arbitration system wherein the arbitration is time phased, or partitioned in time to transpire across a number of contiguous cycles. If each of the time phased arbitration cycles transpire on the same bus communication line, then a large number of contending devices can be arbitrated amongst a small number of communication lines (IC device I/Os).

FIG. 2 is a timing diagram for a typical arbitration scheme. At point A, which is the default state, the CPU (arbitration level F) owns the bus. Generally, the CPU will have the lowest arbitration priority since it owns the bus during the default state. At point B, a peripheral device (busmaster) needs the bus and drives a PREEMPT# signal active which indicates that a request for the bus has occurred. The central arbiter recognizes the active PREEMPT# signal and begins an arbitration cycle at point C. The requestor(s) then arbitrate for access to the bus by comparing their priority values. At point D, the requestors have completed the arbitration and determined that peripheral device 5, e.g. DMA 5 of FIG. 1, has won access to the bus. The central arbiter then ends the arbitration cycle at point E and the bus is granted to DMA 5. Upon winning the bus, DMA 5 releases (deactivates) its PREEMPT# signal and drives a BURST# signal active to maintain ownership of the bus. At point F, the peripheral device (DMA 5) is finished with the bus and releases the BURST# signal. The central arbiter recognizes the release of the bus and runs an arbitration cycle at point G and if there are no other requests, bus ownership returns to the CPU by default (point H).

However, it can be seen that problems will arise when it is desired to connect plural computer systems through a single bus, since each computer will have a central arbiter. Of course, the central arbiter could be removed from the attached computer subsystems, but this would mean costly reworking of the subsystem, since the central arbiter is usually packaged along with other necessary components on a single integrated circuit device package, i.e. a single chip. Thus, in order to preserve the subsystem function, the chip containing the central arbiter would have to be reworked to remove that function. It can be seen that an addition to the subsystem that would cause the central arbiter to act like a slave arbiter and thus allow interconnection of plural computer subsystems to a single bus along with a host computer would be very desirable. IBM TDB "Shared Master/Slave Device" discusses a device which includes master and slave operations. This device allows for the occurrence of slave operations at any time, but does not inhibit the device's effectiveness as a busmaster. IBM TDB "Dual Master Bus Isolator" discusses hardware logic circuitry that transparently interconnects two microprocessor buses by treating each bus as a virtual address when one bus accesses the other. IBM TDB "Movable Bus Arbiter and Shared Bus Address" describes a method that allows sharing of bus arbitration between two bus devices. Two processors can share the same bus address and arbitration function so that their existence is transparent to other I/O devices on the bus. It can be seen that these references provide transparency to bus devices when two processors are used. However, a problem still exists in the prior art wherein multiple computer subsystems cannot be interconnected without reworking the chip set.

SUMMARY OF THE INVENTION

In contrast to the prior art, the present invention provides a means of allowing a plurality of computer subsystems, each having a central arbiter, to be interconnected with a host system on the host system bus that also includes a central arbiter.

Conversion logic, in the form of hardware, is added to each computer subsystem desired to be interconnected to the host. The conversion logic is positioned between the arbitration buses of the host system and subsystem and includes two request arbiters, one of which arbitrates for the host system arbitration bus, and the other which arbitrates for the subsystem arbitration bus. At the default state, the conversion logic has successfully arbitrated for, and is maintaining control of the subsystem bus. After a request from a subsystem device for access to the host bus, the conversion logic arbitrates for control of the host bus. When control of the host bus is awarded to the conversion logic, control of the subsystem bus is released and the requesting subsystem device can transfer data between the subsystem and host.

In accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
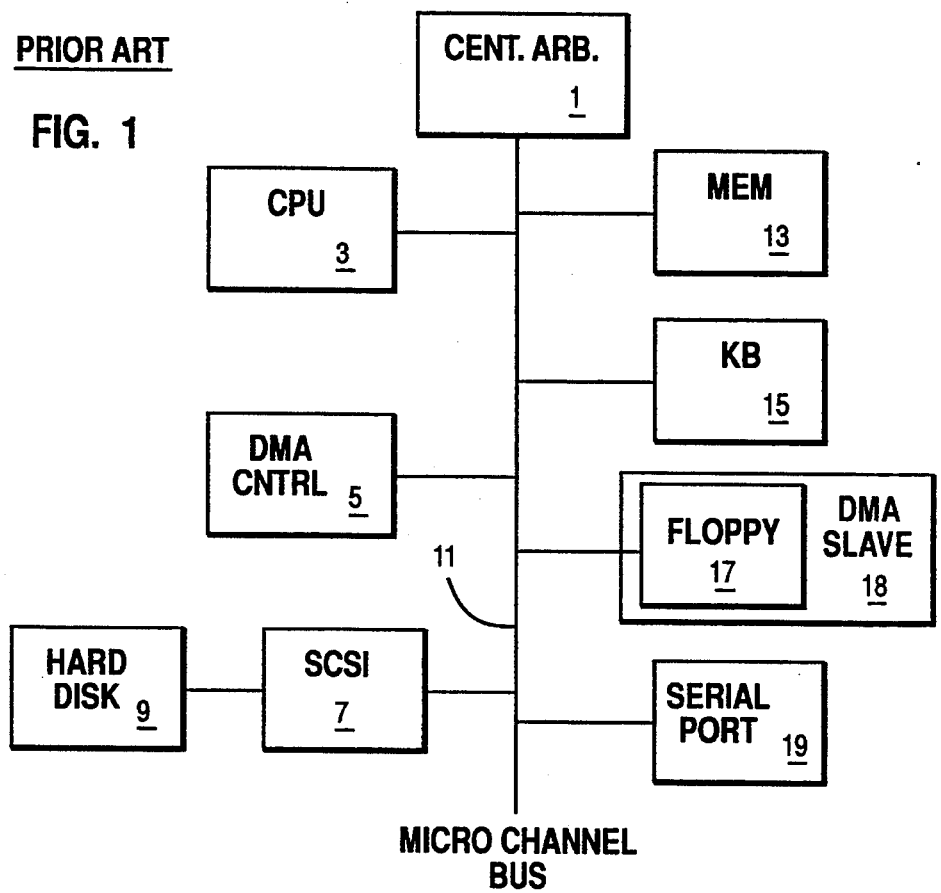
FIG. 1 is a schematic diagram of a single bus with a central arbiter, commonly used in computer systems.
Figure 3:
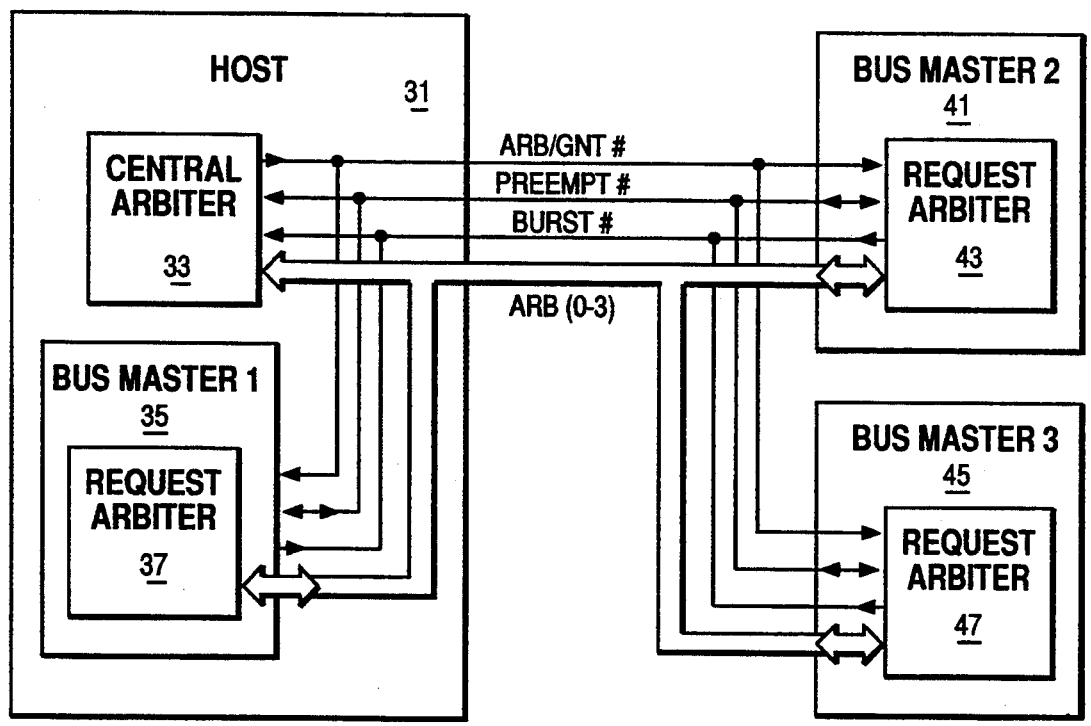
FIG. 3 is another schematic diagram illustrating a central arbiter and plural busmasters with the signals generated to arbitrate for the bus.
Figure 2:
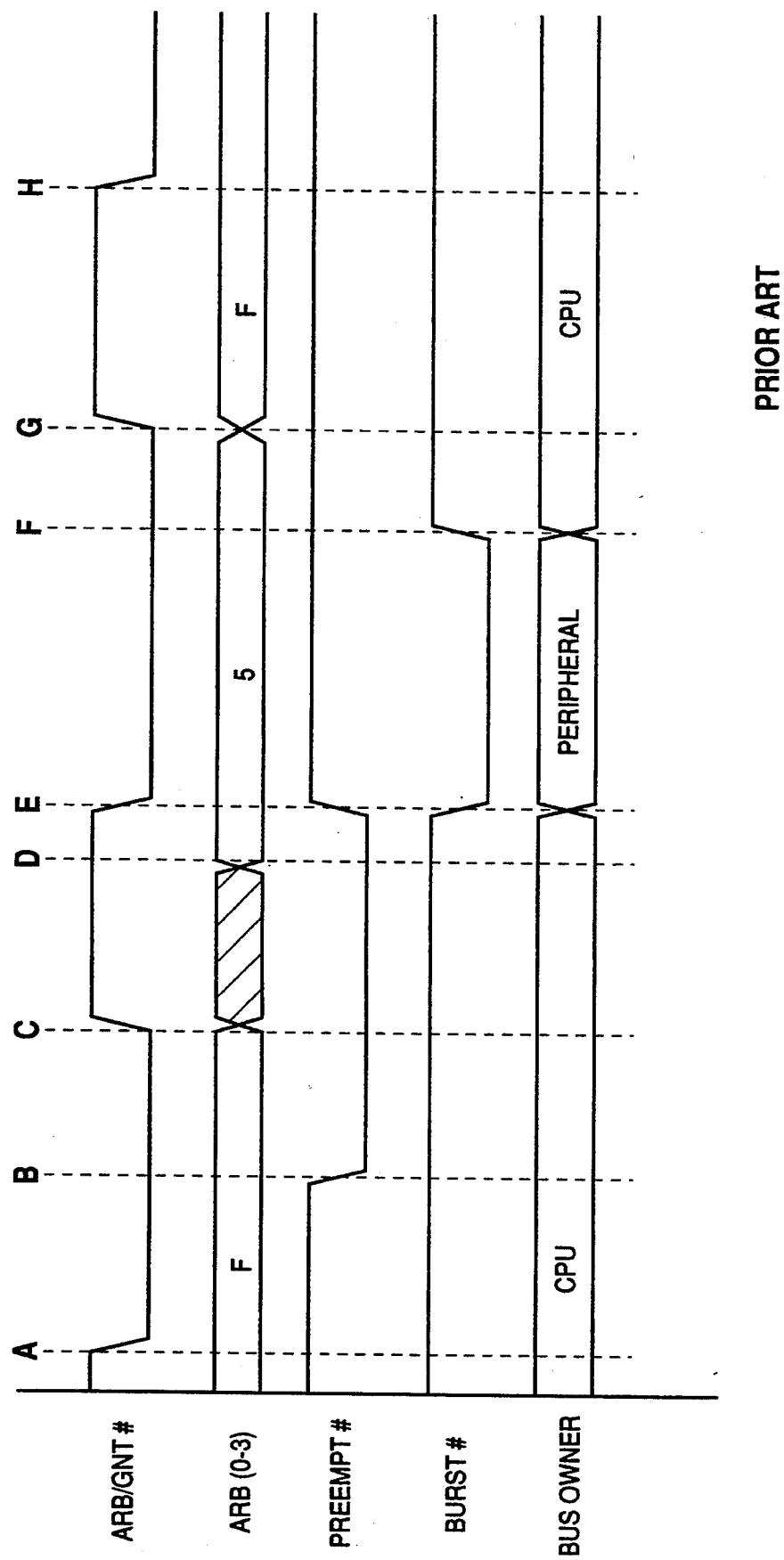
FIG. 2 is a timing diagram showing a priority scheme for accessing a bus, such as shown in FIG. 1, by a busmaster with a requesting arbiter.

Referring to FIG. 3, a schematic diagram is shown which represents the signals required for normal arbitration on a Micro Channel host system having a Micro Channel bus. It will be understood by those skilled in the art that a Micro Channel bus includes an arbitration bus on which the arbitration procedures previously described in conjunction with the conversion logic 100 (FIG. 5) will occur, and an address, control and data bus on which the actual data is transferred. Unless otherwise specified the term "bus" as used herein will refer to an arbitration bus. A host system 31 is shown and includes a central arbiter 33 and request arbiter 37 which is part of a busmaster device 35. As previously noted busmaster 35 may be one of several devices such as a central processing unit, DMA controller, SCSI interface, or the like, that includes a request arbiter. Other busmaster devices 41 and 45 are shown interconnected to host system 31. Busmaster 41 includes request arbiter 43 and busmaster 45 includes request arbiter 47. Next, an arbitration scheme will be described for the configuration of FIG. 3 wherein busmaster 35 is assumed to be a central processing unit (CPU). The default state of all Micro Channel adapters is to not own the bus such that the CPU will be the bus owner. It can be seen that since the CPU is the most active device connected to the Micro Channel bus it should be the default bus owner. Accordingly, the CPU is generally assigned the lowest priority arbitration value so that other requesting arbiters will have the opportunity to transmit data through the Micro Channel bus. In the current example, assume that the Micro Channel adapter and CPU are in their default states wherein the CPU is the bus owner. Additionally, assume busmaster 41 desires access to the Micro Channel bus. In this case, request arbiter 43 drives a PREEMPT# signal active which is recognized by all other interconnected arbiters, i.e. central arbiter 33 and request arbiters 37 and 47. At this time, central arbiter 33 recognizes the active preempt signal and begins an arbitration cycle that will determine ownership of the bus. Central arbiter 33 drives an arbitration signal that is output to each request arbiter indicating that arbitration will begin. Each requesting arbiter is assigned a priority number which is then output on the arbitration channel, ARB(0-3) and compared with other requesting arbiters, if any. The central arbiter then determines the highest priority requesting arbiter. It should be noted that arbitration will occur even if there is only a single requesting arbiter since the CPU is the default owner and will always be involved in arbitration. In the current example, request arbiters 37, 43 and 47, each output their priority value which is then compared by the central arbiter 33 and grants the bus to the highest priority requesting arbiter by driving the ARB/GNT# signal to logical 0. The central arbiter initiates the arbitration cycle and the requesting arbiters maintain their priority values on the ARB(0-3) channel. At the end of the arbitration cycle requesting arbiter checks the arbitration bus and the requestor having that particular priority number recognizes itself as the winner. Assuming that request arbiter 43 is the winner, a BURST# signal is then output by requesting arbiter 43 in order to maintain ownership of the bus while the transfer of data occurs on the Micro Channel address, control and data bus. Once the data transfer is complete, request arbiter 43 will release the BURST# signal that is recognized by the central arbiter 33 which then runs an arbitration cycle to again determine ownership of the bus. It should be noted in FIG. 3 that the ARB/GNT#, PREEMPT# and BURST# signals correspond to single wires on the arbitration bus interconnecting the requesting arbiters and central arbiter. The ARB(0-3) priority values correspond to 4 bits stored in the central and requesting arbiters. The ARB/GNT# signal indicates that an arbitration cycle will begin when it is set to logical 1 and that the bus is granted to a particular busmaster when the signal is equal to a logical 0. A request for the bus is indicated by the PREEMPT# signal when it is set equal to a logical 0. Logical 1 of the PREEMPT# signal indicates that there are no PREEMPT requests pending. The BURST# signal set equal to a logical 1 indicates the availability of the bus, whereas BURST# set equal to logical 0 indicates that a busmaster device currently owns the bus and access by other busmasters devices is not possible until the transfer of data is complete and the BURST# signal is released. The ARB(O-3) signals allow for the priority numbers of each requesting arbiter to be stored as a 4-bit number therein. Thus, it is possible for 16 different priority numbers to be included. However, only 15 requesting arbiters are possible since one priority number is reserved for the host system.

Figure 4:
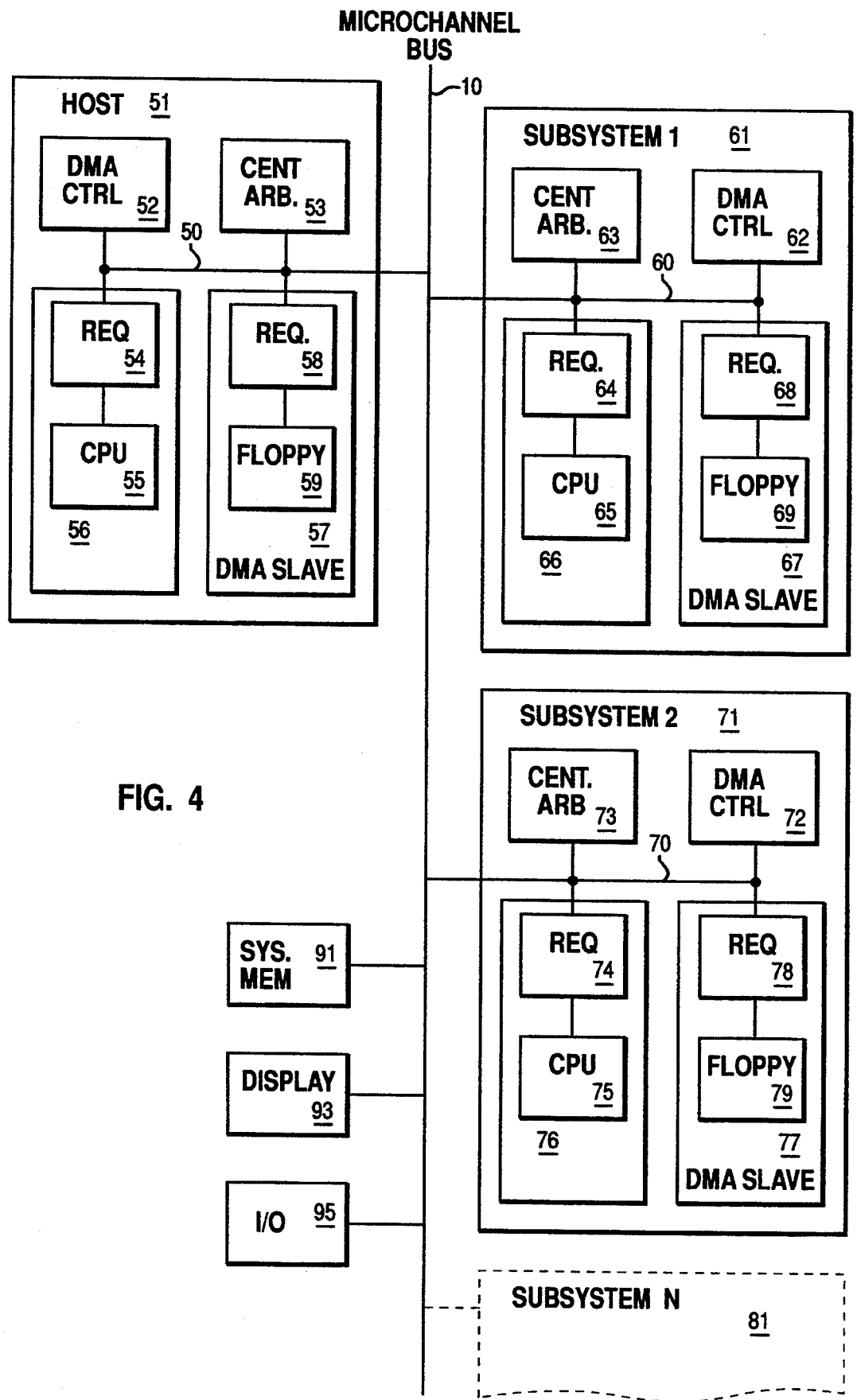
FIG. 4 shows the problem, solved by the present invention, of plural subsystems each with central arbiters interconnected to the host system.

FIG. 4 is a block diagram showing an arbitration scheme with a host system 51 and plurality of subsystems attached to one another via a Micro Channel bus 10. Host system 51 includes a DMA controller 52 and central arbiter 53 as well as busmaster devices 56 and 57. Busmaster 56 includes a requesting arbiter 54 and CPU 55. Busmaster 57 is a DMA slave device that includes requesting arbiter 58 and floppy disk 59. It should be noted that the CPU and DMA slave busmaster devices are shown for exemplary purposes only and should not be construed as limiting the present invention to these specific types or number of busmaster devices. Additionally, host system 51 includes host internal system bus 50 which interconnects DMA controller 52 and central arbiter 53 with the requesting arbiters 54 and 58 of busmaster devices 56 and 57, respectively.

Subsystem 61 includes central arbiter 63 and DMA controller 62 interconnected via internal subsystem bus 60 to busmaster devices 66 and 67. Busmaster 66 includes CPU 65 and requesting arbiter 64, whereas busmaster 67 (DMA slave) includes floppy disk 69 and requesting arbiter 68.

Another subsystem 71 is shown and includes elements identical to subsystem 61, previously described. In particular, the DMA controller 72 and central arbiter 73 are connected via an internal subsystem bus 70 to busmaster devices 76 and 77. Busmaster 76 includes requesting arbiter 74 and CPU 75, and busmaster 77 (DMA slave) includes requesting arbiter 78 and floppy disk drive 79. Additional subsystems that may be interconnected to the existing subsystem 61, 71 and host system 51 via Micro Channel bus 10 are represented by reference numeral 81. Additionally shown interconnected bus 10 are host peripheral devices such as system memory 91, display 93 and input/output (I/O) devices 95, such as a keyboard, mouse, or the like.

It can be seen how the configuration of FIG. 4 is desirable in todays computing environment. Subsystems 61 and 71 represent substantially stand alone computer systems which may be interconnected to host system 51 in order to provide expanded processing capabilities, as well as the capability of running multiple software operating systems or program applications within a single host system. It can also be seen that a problem exists since the chip set that embodies subsystem 61 and 71 each include central arbiters 63 and 73, respectively. Bus contention problems arise when plural central arbiters are interconnected to one another and award access to the address, control and data bus to different busmaster devices. For example, host central arbiter 53 and subsystem 61 central arbiter 63 may each grant the address, control and data bus to different busmaster devices resulting in bus contention, data collisions and ultimately a crash of the system. Further, it can be seen that removal or disablement of the subsystem central arbiters 63, 73 is not a practical solution since reworking of the chip set is required. Thus, a solution is needed that will allow the use of a standard chip set for a PS/2, RISC System/6000, or other subsystem to be used and interconnected to a host system via a Micro Channel bus.

Figure 5:
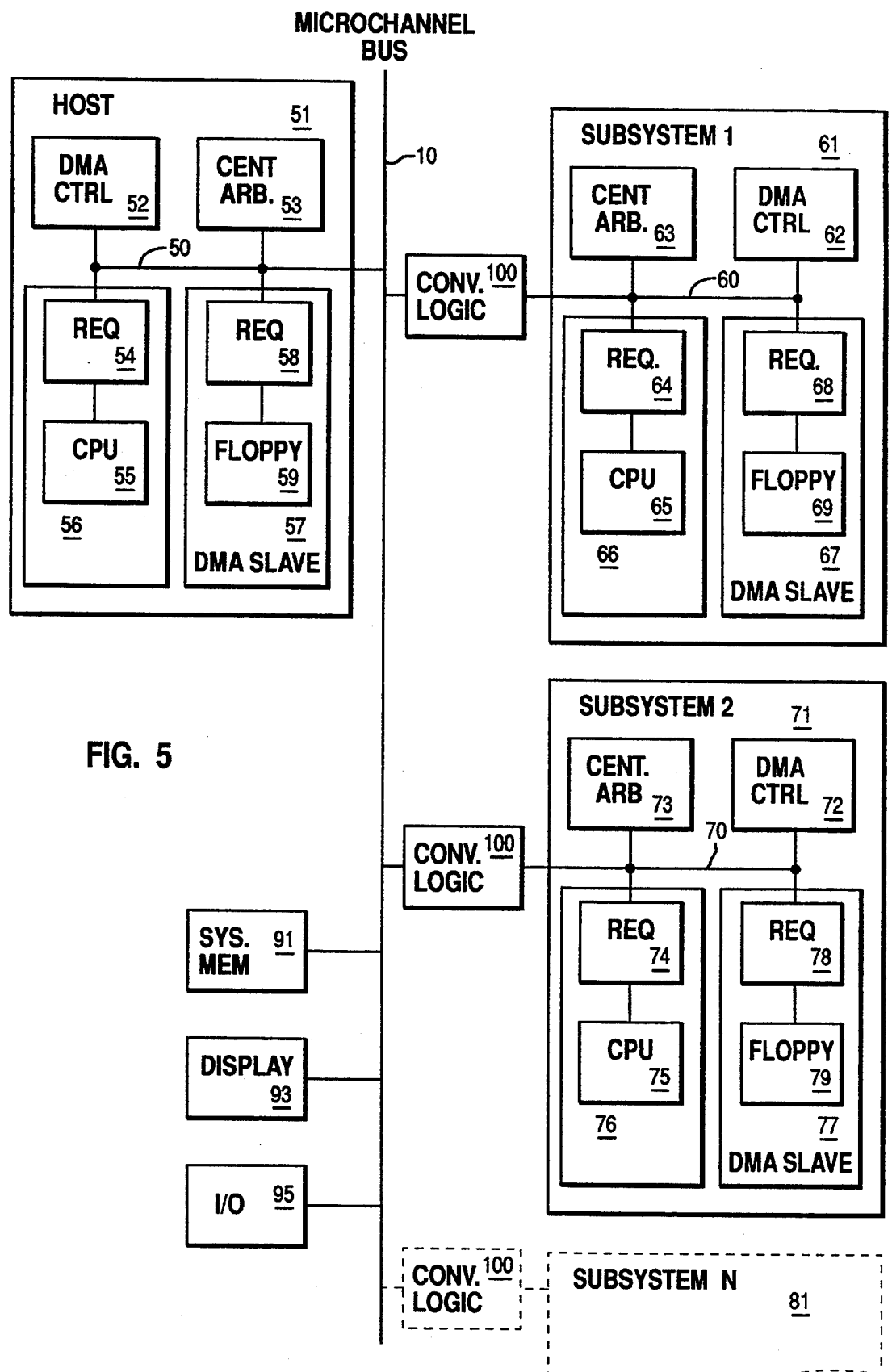
FIG. 5 is a schematic of the host system and plural subsystems of FIG. 4 including the conversion logic of the present invention.

FIG. 5 shows the same elements as previously discussed with regard to FIG. 4, but also includes the conversion logic device 100 of the present invention. Conversion logic 100 will coordinate access to the address, control and data bus 98 (FIG. 6) by effectively transforming central arbiters 63 and 73 of subsystems 61 and 71, respectively, into another busmaster, or slave arbitration device. The converted central arbiters will not have an associated slave device, but will essentially arbitrate for the internal subsystem bus, e.g. buses 60, 70 of subsystems 61 and 71, respectively. Conversion logic 100 may be included as an additional chip on the chip set of the subsystem device or be included in an existing programmable logic device of the subsystem being interconnected.

Basically, conversion logic 100 includes two additional requesting arbiters one which arbitrates for control of the internal subsystem buses 60, 70 and another requesting arbiter that arbitrates for the Micro Channel bus 10. Upon being granted the host system bus, the conversion logic releases control of the subsystem bus. Therefore, an arbitration cycle occurs on the subsystem bus and the busmaster device with the highest priority value is awarded the subsystem bus. The subsystem busmaster device requesting access to the Micro Channel bus will be the likely arbitration winner, unless there is more than one subsystem busmaster requesting access to the Micro Channel. Transfer of data can then occur between a busmaster device in the subsystem and a slave device in the host system, i.e. a busmaster device within a subsystem may access the host system slave devices and any other peripheral devices attached to the Micro Channel bus. For example, CPU 75 of subsystem 71 may read from system memory 91, or floppy 59 of host system 61.

Figure 6:
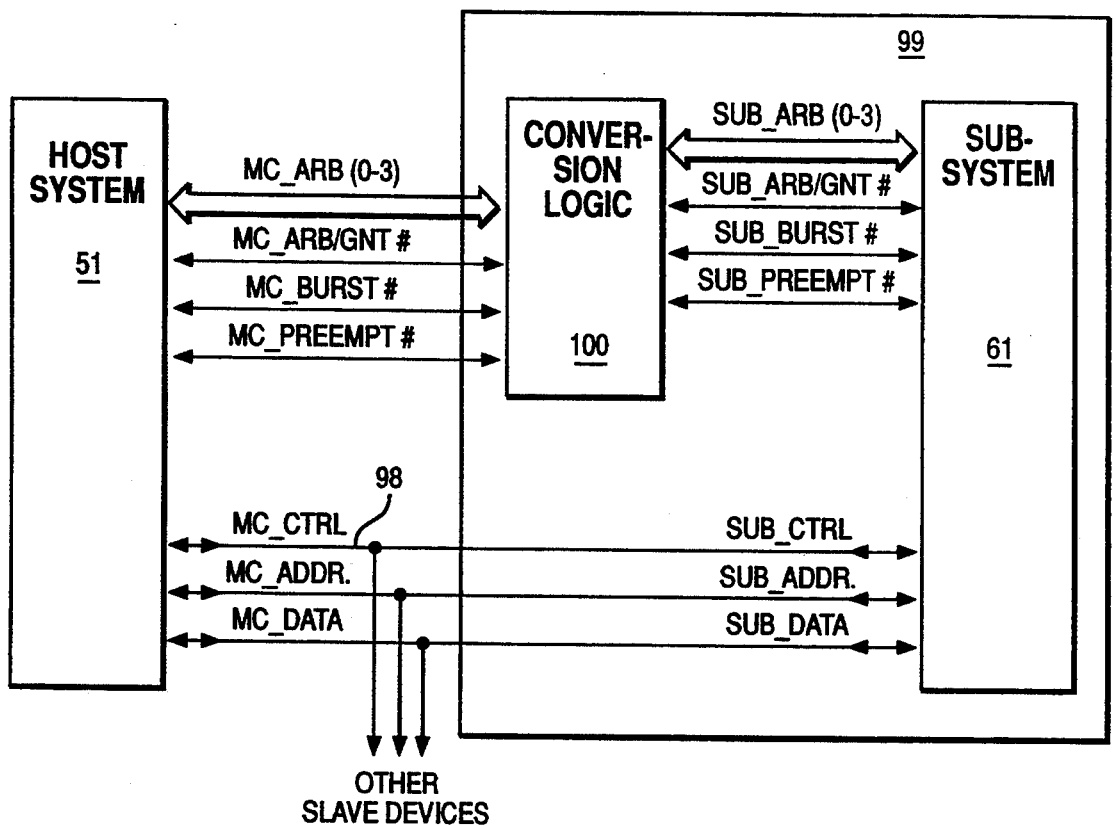
FIG. 6 is a schematic showing the structure of the conversion logic as part of a module that includes the subsystem.

FIG. 6, represents the signal flow between the host system 51, conversion logic 100 and its corresponding subsystem 61. Host system 51 is shown interconnected to a module 99 that will include the chip set corresponding to a subsystem, e.g. 61 and conversion logic 100. As stated above, conversion logic 100 can be included in an existing programmable logic device of subsystem 61 or added as an additional chip. It will be understood that one requesting arbiter within conversion logic 100 (FIG. 7) will arbitrate for the internal arbitration bus of subsystem 61. The signals representing the arbitration process are identical to those previously described with regard to FIG. 3. That is, SUB_PREEMPT# is a request by the conversion logic 100 arbiter for control of the subsystem internal bus. SUB_ARB/GRANT# will initiate the subsystem internal bus arbitration cycle when set equal to logical 1 by central arbiter 63 of subsystem 61. Subsequent to arbitration, which occurs on the SUB_ARB(O-3) channel as previously described, the SUB_ARB/GNT# will be set equal to logical 0 by subsystem central arbiter 63, thereby awarding the bus to the requesting arbiter with the highest priority, in this case the subsystem requesting arbiter of conversion logic 100. In this example, the subsystem requesting arbiter of conversion logic 100 is assumed to have won the arbitration and then outputs the SUB_BURST# signal to hold the subsystem bus 60. Concurrently, the other requesting arbiter in conversion logic 100 outputs a MC_PREEMPT# signal on the Micro Channel (MC) arbitration bus 10, that is interconnected to the internal bus 50 of host system 51. Therefore, central arbiter 53 of host system 51 will set the MC_ARB/GNT# signal equal to logical 1 thereby initiating the arbitration cycle. Arbitration will then occur in a manner previously discussed between the MC requesting arbiter within conversion Logic 100 and any other requesting arbiters within host system 51. The MC_ARB(0-3) channel is used to compare the priority values of the requesting arbiters during the arbitration cycle. Upon resolution of the arbitration, central arbiter 53 sets the MC_ARB/GNT# signal to logical 0, thereby granting the Micro Channel bus to the requesting arbiter with the highest priority. In this case the MC requesting arbiter of conversion logic 100 is assumed to have won the arbitration and outputs a MC_BURST# signal to maintain ownership of the bus during transfer of data between a busmaster device and a slave device. At this point, the conversion logic 100 has successfully arbitrated and is holding the internal subsystem arbitration bus 60. Also, the Micro Channel arbitration bus 10 (also interconnected host internal bus 50) has been awarded to conversion logic 100. Subsequent to being awarded the MC bus, conversion logic 100 releases subsystem bus 60 and an arbitration cycle is run thereon. The winner of the subsystem arbitration cycle (most likely the device requesting access to the MC bus) is then allowed access to the MC bus, being held by the MC_BURST# signal from conversion logic 100. Thus, data can then be transferred between a busmaster, or slave device in the host system (a device interconnected to the Micro Channel bus 10) and a busmaster or slave device within the subsystem 61. It should be noted that the actual data will be transferred over the address, control data bus to which each of the host and subsystem devices is connected, not the arbitration buses 50, 60, 70 of FIG. 5. Conversion logic 100 allows for the control information, address information and actual data of the subsystem (SUB_CTRL, SUB_ADDR, SUB_DATA) to be output to the Micro Channel bus where it is then represented as signals MC_CTRL, MC_ADDR, and MC_DATA. In this manner, information can be transferred between a subsystem, host system and other peripheral devices, interconnected by a Micro Channel bus, without fear of the problems of bus contention, data collision, and the like.

Figure 7:
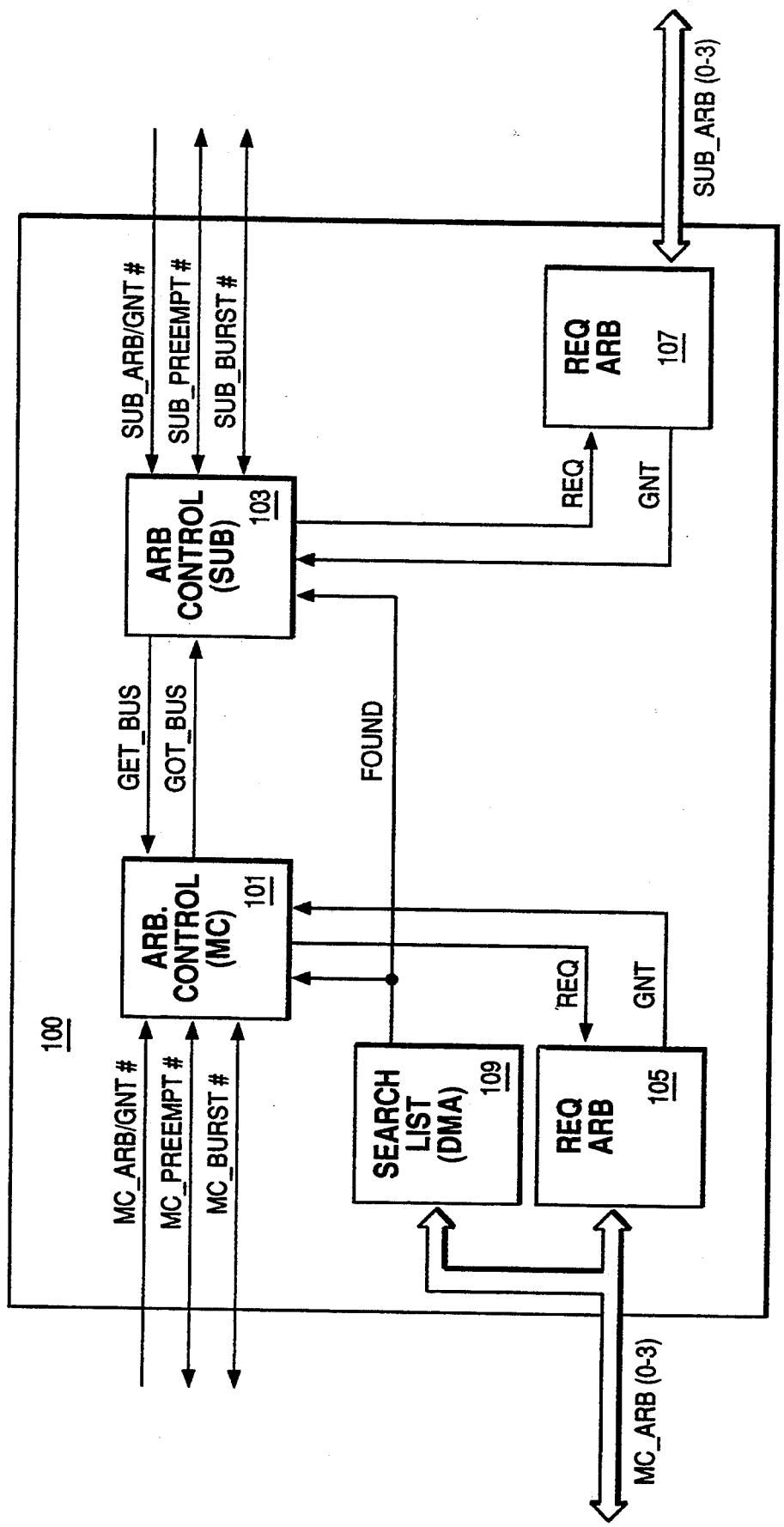
FIG. 7 is a schematic of the conversion logic of the present invention showing the request arbiters included therein.

Referring to FIG. 7 a schematic diagram of the conversion logic device 100 and its internal components are shown. The arbitration signals transmitted between the various components of conversion logic 100 are represented in FIG. 7. A Micro Channel arbitration control circuit 101 is shown and interconnected with the MC_ARB/GNT#, MC_PREEMPT#, MC_BURST# signals as previously discussed. A subsystem arbitration control circuit 103 is also provided and interconnected to the subsystem arbitration signals of SUB_ARB/GNT#, SUB_PREEMPT# and SUB_BURST#. Subsystem arbitration control 103 outputs a GET_BUS (Micro Channel) signal in response to the input of a bus request (PREEMPT#) signal input from a busmaster device in the subsystem. MC arbitration control circuit 101 will output a GOT_BUS signal to subsystem arbitration control 103 upon successful arbitration for the Micro Channel bus. Request arbiter 105 is also provided and interconnected to arbitration control circuit 101. Request arbiter 105 will actually arbitrate for the Micro Channel bus along the MC_ARB-(0-3) channel. Arbitration control circuit 101 outputs a request signal (REQ) to request arbiter 105 indicating that a PREEMPT# signal has been input from a subsystem busmaster and an arbitration cycle for the Micro Channel bus is about to begin. Request arbiter 105 then outputs the priority value for the conversion Logic 100 and returns a grant (GNT) signal to arbitration control circuit 101 upon granting of the Micro Channel bus to conversion logic 100. Similarly, requesting arbiter 107 is provided and interconnected to the subsystem via SUB_ARB(O-3) channel. AT the beginning of an arbitration cycle for the subsystem bus, arbitration control circuit 103 outputs a subsystem bus request signal (REQ) to the requesting arbiter 107 which then arbitrates for the subsystem bus. Upon successfully obtaining access to the subsystem bus, a grant signal (GNT) is output from requesting arbiter 107 to the arbitration control circuit 103. In this manner, subsystem requesting arbiter 105 will maintain ownership of the subsystem bus, until the MC bus is awarded to conversion logic 100 after it successfully arbitrates for the MC bus on behalf of a requesting subsystem busmaster device. Subsequent to the MC bus being awarded to conversion logic 100, the SUB_PREEMPT# signal is released by arbitration control circuit 103 and an arbitration cycle is run on the subsystem bus. The requesting subsystem busmaster device with the highest priority value is then awarded the subsystem bus and data can be transferred between the host and subsystem.

A special case exists when a DMA controller busmaster device on the Micro Channel bus desires to exchange data with a particular a DMA slave device on a subsystem bus (see FIG. 5). To address this problem, a DMA search list 109 is provided and interconnected to the MC_ARB(0-3) channel. Search list 109, such as a look up table, allows the priority values for the DMA slave device on the subsystem to be matched with a DMA busmaster on the Micro Channel and when the priority value for the DMA busmaster is found on search list 109 a signal is output to the arbitration control logic circuits 101 and 103. The operation of control logic 100 and its relation to the various arbitration signals will be described in more detail below with reference to FIGS. 8 and 9. It should be noted that arbitration control circuits 101, 103, requesting the arbiters 105, 107 and DMA search list 109 can be implemented in hardware using a combination of registers and gate arrays, or the like in addition to the previously mentioned programmable logic device.

Figure 8:
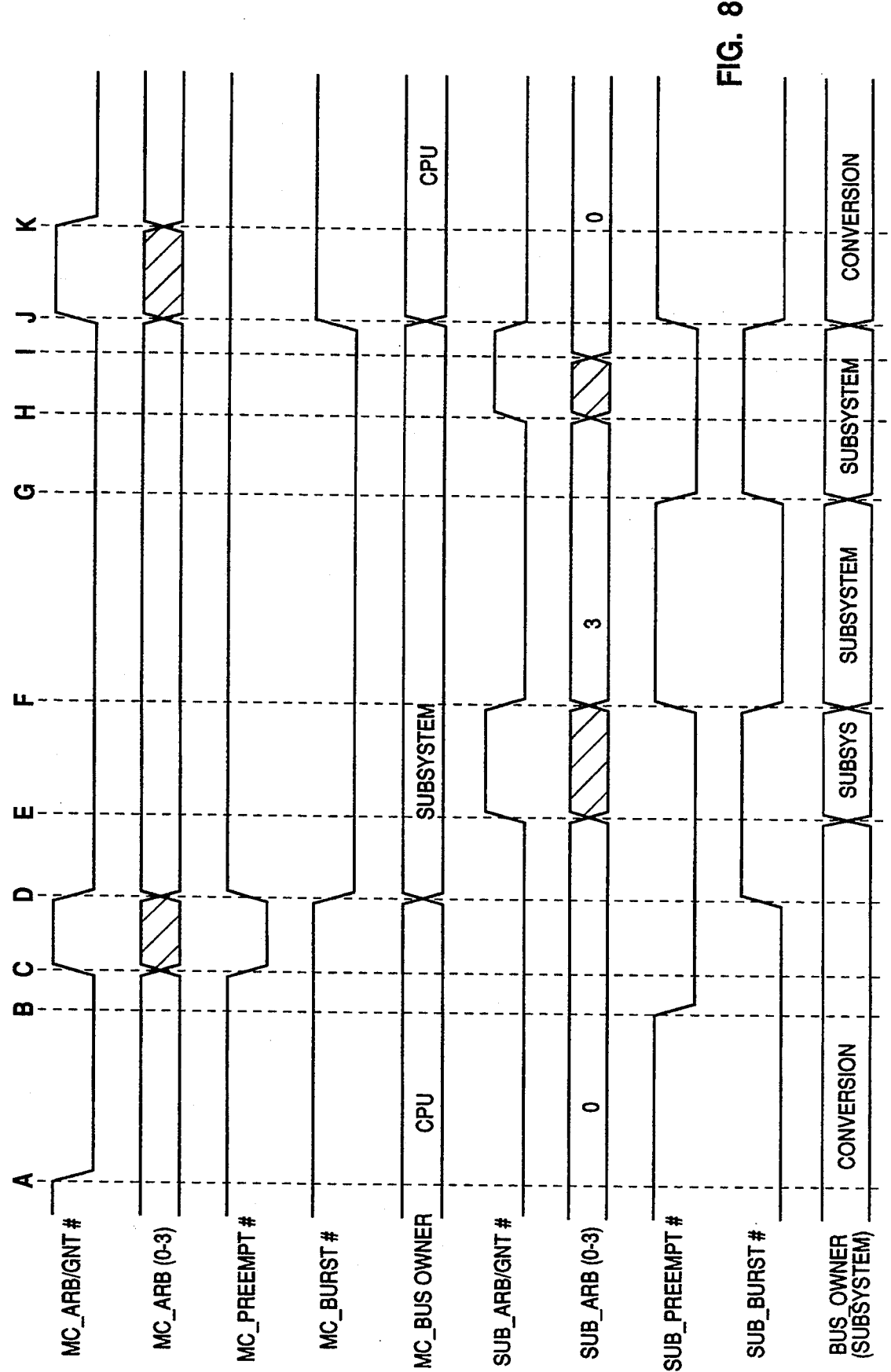
FIG. 8 is a timing diagram illustrating the sequence and signals necessary for one of the plural subsystems to gain access to the system bus.

FIG. 8 is a timing diagram representing a sequence of operations that are performed when a subsystem busmaster device requires access to the Micro Channel bus in order to transmit data to a slave device, interconnected to the Micro Channel bus. For example, referring to FIG. 5, CPU 65 of subsystem 61 may desire to transmit data to system memory 91 interconnected to the Micro Channel bus 10. Referring to FIG. 8, at point A the system is in its default state, i.e. the host CPU 55 owns the Micro Channel bus and conversion logic 100 owns the subsystem bus and prevents subsystem busmaster devices from obtaining access to the Micro Channel bus. At point B a subsystem busmaster requests the Micro Channel bus and drives the SUB_PREEMPT# signal active by setting it equal to logical 0. At this time arbitration control circuit 103 outputs a GET_BUS signal to arbitration control circuit 101 which in turn drives the MC_PREEMPT# signal active (point C). The host (Micro Channel) central arbiter 53 recognizes the MC_PREEMPT# signal and runs an arbitration cycle for the Micro Channel bus. During this arbitration cycle conversion logic 100 arbitrates on behalf of the subsystem bus 60. It should be noted that if plural conversion logic circuits are included they cannot all have the highest priority value and access to the Micro Channel bus is not always initially obtained. However, the MC_PREEMPT# active signal is maintained until successful arbitration for the Micro Channel bus occurs. At point D, arbitration for the Micro Channel bus has ended and it is assumed that the bus is granted to conversion logic 100 and the MC_ARB/GNT# is set equal to logical 0 by host central arbiter 53. Once conversion logic 100 obtains the Micro Channel bus, the MC_BURST# is driven active such that conversion logic 100 will maintain control of the bus. At this time, conversion logic 100 releases the SUB_BURST# signal such that arbitration for the subsystem bus can then occur. The MC_PREEMPT# signal is also deactivated since the request for the Micro Channel bus has been granted. The subsystem central arbiter, e.g. 63, at point E, recognizes that conversion logic 100 has released the subsystem bus since the SUB_BURST# signal has been deactivated and then begins running an arbitration cycle. The subsystem runs the arbitration cycle between points E and F, at which point the subsystem bus is granted to the subsystem busmaster device that wins the arbitration. It should be noted that the conversion logic does not compete with the requesting subsystem busmaster device for the subsystem bus during the arbitration cycle between points E and F. At point F, the subsystem central arbiter drives the SUB_BURST# signal active in order to maintain control of the subsystem bus. At this point, the subsystem busmaster device desiring to transfer data onto the Micro Channel bus owns the subsystem bus and conversion logic owns the Micro Channel bus. Therefore, data can be transferred from the subsystem busmaster device onto the Micro Channel bus. At point G, the subsystem busmaster device has completed the transfer of data and no longer requires ownership of the subsystem bus and releases the SUB_BURST# signal a point G. Concurrently, the conversion logic recognizes release of the subsystem bus and takes action to reacquire the bus from the subsystem by activating a SUB_PREEMPT# signal. The conversion logic must acquire the bus from the subsystem prior to allowing the host system to reacquire the Micro Channel bus. At point H, the subsystem central arbiter 63 recognizes the SUB_PREEMPT# active signal and begins an arbitration cycle by setting the SUB_ARB/GNT# equal to logical 1. The conversion logic subsystem requesting arbiter 107 has been assigned the highest priority level (0) for the subsystem devices, thereby ensuring that conversion logic 100 will win the arbitration and acquire ownership of the subsystem bus (point I), which is the default state. Thus, the subsystem central arbiter 63 is effectively converted to a requesting arbiter. The subsystem central arbiter 63 then grants the bus to the conversion logic by setting the SUB_ARB/GNT# equal to logical 0. At point J, the conversion logic then releases the SUB_PREEMPT# signal since its request for ownership of the bus has been honored and drives the SUB_BURST# active in order to maintain control of the subsystem bus (default state). The conversion logic now may release the MC_BURST# signal telling the host central arbiter that the subsystem has completed its use of the host bus. The host central arbiter 53 then runs an arbitration cycle and at point K the host central processing unit is granted control of the Micro Channel bus (default). In this default state, depicted in FIG. 8, the host central processing unit reacquires ownership of the host system bus. It should be noted that busmaster devices on the Micro Channel or host bus must compete with the conversion logic requesting arbiters during a host arbitration cycle in order to gain ownership of the host bus. Busmaster devices on the Micro Channel (host) bus 10, 50, may transfer, or exchange data with any of the subsystem slave devices at any time since the slave devices are not part of the arbitration scheme. For example, the slave devices are only interconnected to the control, address and data portions of the Micro Channel. However, it should be noted that each subsystem slave device includes a Logic switch that only allows access by a single busmaster device. That is, either the host CPU or subsystem CPU can exchange data, but only one at a time.

Figure 9:
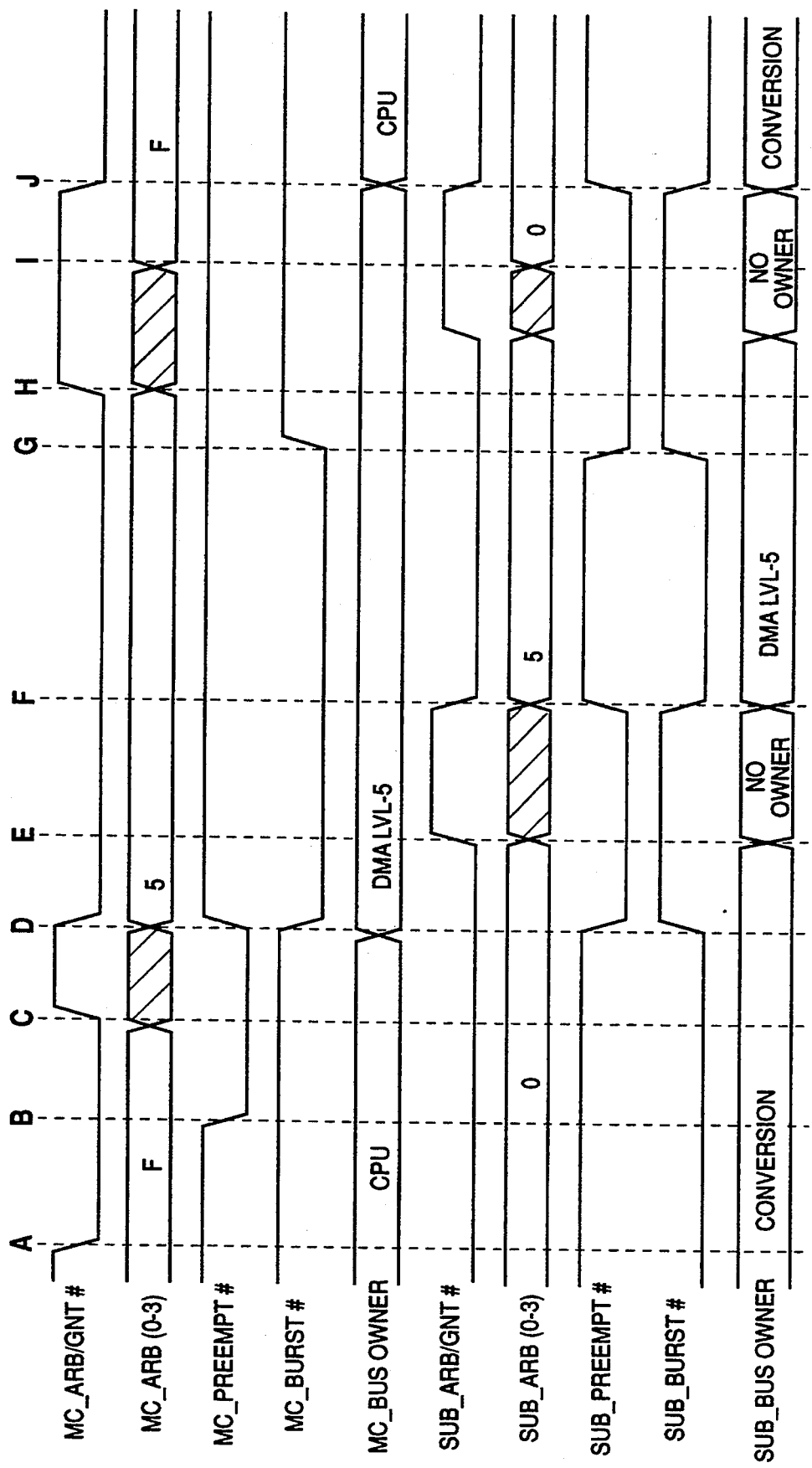
FIG. 9 is a timing diagram showing the sequence and signals required when the host system DMA must gain access to a subsystem bus.

The special case of a DMA slave device on the host system, e.g. 57 (FIG. 5) desiring access to a DMA controller, e.g. 62, on subsystem bus 60 will be described with reference to the timing diagram of FIG. 9. At point A, the system is in the default state wherein host CPU 55 owns the Micro Channel bus and conversion logic 100 maintains ownership of the subsystem bus 60 by continuing to keep the SUB_BURST# signal active. At point B, the host DMA slave indicates that it is ready to move data to the subsystem and activates the MC_PREEMPT# signal. Host central arbiter 53, in response to the PREEMPT# signal then runs an arbitration cycle at point C by setting the MC_ARB/GNT# signal equal to logical 1. The arbitration occurs from points C to D and it is assumed, for this example, that the host DMA slave device wins the arbitration. Again, arbitration for the Micro Channel bus occurs between all the Micro Channel busmaster devices and all interconnected conversion logic circuits 100. At point D, the Micro Channel bus is granted to the DMA slave device. The conversion logic circuit then notes the priority value of the device that won the arbitration, in this example level 5, and compares this priority value to values in DMA search list 109. This search list contains the arbitration levels that this DMA controller on this particular subsystem is to service. After recognizing the arbitration value as corresponding to the subsystem DMA controller, the conversion logic releases its hold on the subsystem bus by driving the SUB_BURST# signal to a logical 1. At the same time, the conversion logic requests ownership of the subsystem bus on behalf of the DMA slave device that owns the Micro Channel bus, by driving the SUB_PREEMPT# signal active. At step E, the subsystem central arbiter 63 runs an arbitration cycle wherein the conversion logic arbitrates on behalf of the DMA slave device and uses the identical priority value of the slave. It should be noted that the subsystem bus must be configured such that ownership of the bus is not transferred during the arbitration cycle, since the host DMA slave device already believes that it owns the subsystem bus, i.e. the host DMA slave already arbitrated for the Micro Channel bus and is unaware of the existence of an interconnected subsystem bus or conversion logic. Additionally, it should be noted that the host DMA slave arbitration value must have a high enough priority value to ensure that the conversion logic will win the subsystem bus when arbitrating on behalf of the DMA slave device, using its corresponding priority value. At point F, subsystem bus 60 is granted to DMA slave device 57 and the direct memory access and data is transferred between DMA slave 57 and DMA controller 62. The DMA data transfer is completed at point G and the subsystem bus is released by deactivating the SUB_BURST# signal (setting equal to logical 1). In order to return to the default state, the conversion logic must regain control of the subsystem bus. Therefore, conversion logic arbitration control circuit 103 drives a SUB_PREEMPT# signal active. The subsystem central arbiter 63 then runs an arbitration cycle to determine the subsystem bus owner. At approximately the same time, host DMA slave device has released the MC_BURST# signal and the Micro Channel central arbiter 53 then runs an arbitration cycle to determine ownership of the host system bus. Between points H and I of FIG. 9, both the host central arbiter 53 and subsystem central arbiter 63 run an arbitration cycle for their respective buses. At point J, the Micro Channel bus is awarded to host CPU 55 (default state) and the host central arbiter 53 drives the MC_ARB/GNT# to a logical 0. Similarly, at point J, the subsystem central arbiter 63 sets the SUB_ARB/GNT# signal to logical 0, thereby returning ownership of the subsystem bus 60 to conversion logic 100 such that the system is now returned to the default state.

Figure 10:
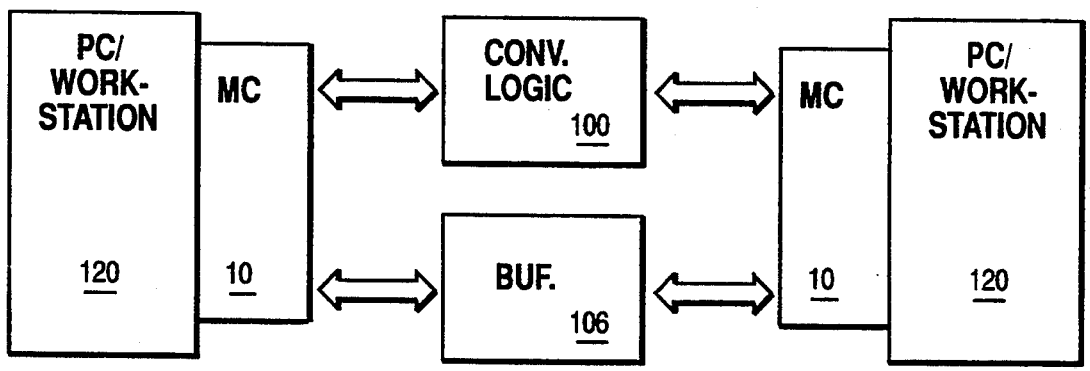
FIG. 10 is a block diagram showing another application of the present invention wherein plural Micro Channel buses can be interconnected.

FIG. 10, is a block diagram illustrating another embodiment of the present invention. It will be understood by those skilled in the art that it is often desirable to interconnect multiple personal computers such as the PS/2, or workstations such as the RISC System/6000 via their respective Micro Channel buses. FIG. 10 shows workstations 120 each including Micro Channel adapter cards 10. Conversion logic 100 of the present invention, is interconnected intermediate the respective Micro Channel buses of the workstation 120. Again, conversion logic 100 contains the components shown in FIG. 7 such that each requesting arbiter will compete for ownership of the Micro Channel bus to which it is attached. In operation, the system of FIG. 10 functions identically to the system shown in FIG. 5 and discussed in detail above with reference to FIGS. 5-9. In this case, one of the workstations 120 and its associated Micro Channel bus will in effect be substituted for the subsystem bus in the previous description. Additionally, a buffer 106 is provided for the control, address and data information that is to be passed between the interconnected workstations 120 via their Micro Channel buses. Buffer 106 ensures that any problems associated with the bus contention or data collision will be eliminated, since data is buffered and transmitted to the other workstation only when each Micro Channel 10 is available.

Thus, it can be seen that the present invention provides an efficient means of interconnecting plural computer systems without the necessity of reworking the chips in order to disable, or remove a central arbiter. Implementation of the present invention merely requires that a minimal number of registers and logic gate arrays be added in order to make a subsystem central arbiter act like a slave arbiter from the point of view of a host signal.

Although certain preferred embodiments have been shown and described, it should be understood that many changes and modifications may be made therein without departing from the scope of the appended claims. For example, any type of data communication bus is contemplated by the present invention, a Micro Channel bus has been described herein for exemplary purposes only.

What is claimed is:

1. A method of transferring data between a host computer system having a host system bus and at least one interconnected computer subsystem having a subsystem bus, comprising:

maintaining control of said subsystem bus by a conversion logic device connected intermediate said host bus and said subsystem bus to prevent a busmaster device, connected to said subsystem bus, from transferring data on said host bus;

requesting access to said host system bus, by a requesting busmaster device connected to said subsystem bus;

in response to said request for access, arbitrating by said conversion logic device, for control of said host system bus to prevent said host computer system from prematurely transferring data onto said host bus;

subsequent to obtaining control of said host system bus, releasing control of said subsystem bus by said conversion logic device such that said requesting busmaster device can gain control of said subsystem bus; and transferring data between said busmaster device on said subsystem bus and said host system bus when said busmaster device controls said subsystem bus and said conversion logic device controls said host bus.

2. A method according to claim 1 wherein said step of arbitrating for control of said subsystem bus comprises the steps of:

arbitrating, by said control logic device, for control of said subsystem bus when said computer subsystem is initialized;

maintaining a default state wherein access to said subsystem is controlled by said conversion logic.

3. A method according to claim 2 wherein said step of arbitrating for control of said host system bus comprises the steps of:

arbitrating for control of said host system bus upon receipt of a request initiated by said busmaster device;

maintaining control of said host system bus until said transfer of data is complete; and relinquishing control of said host system bus to said default state, wherein said host computer system controls said host bus, after control of said subsystem bus is regained.

4. A system for transferring data between a host computer system having a host system bus with at least one host busmaster device connected thereto, and at least one interconnected computer subsystem having at least one subsystem bus with at least one busmaster device connected thereto, comprising:

means, in said at least one busmaster device, for requesting access to said host system bus;

conversion logic means, connected intermediate said host bus and said subsystem bus, comprising:

means for maintaining control of said subsystem bus to prevent said at least one busmaster device from prematurely transferring data onto said host bus;

means for arbitrating for control of said host system bus, in response to said request for access, to prevent said host computer system from transferring data onto said host bus; and means for releasing control of said subsystem bus, subsequent to obtaining control of said host system bus, such that said requesting busmaster device can gain control of said subsystem bus; and means for transferring data between said busmaster device on said subsystem bus and said host system bus when said subsystem busmaster device controls said subsystem bus and said conversion logic controls said host bus.

5. A system according to claim 4 wherein said conversion logic means comprises:

a subsystem arbitration control circuit for communicating with busmaster devices interconnected to said subsystem bus;

a subsystem arbiter in communication with said subsystem arbitration control circuit and interconnected to said subsystem bus for arbitrating for control of said subsystem bus;

a host arbitration control circuit for communicating with busmaster devices interconnected to said host system bus; and a host arbiter, in communication with said host and subsystem arbitration control circuits and interconnected to said host bus, for arbitrating for control of said host system bus.

6. A system according to claim 5 wherein said conversion logic means further comprises:

means for comparing a priority value of one of said host busmaster devices with a list of priority values corresponding to said subsystem busmaster devices; and means for outputting said priority value to said subsystem arbiter when said host busmaster device priority value and one of said subsystem devices priority values match, wherein said subsystem arbiter uses said priority value when arbitrating for control of said subsystem bus.

7. A system according to claim 6 wherein said subsystem arbitration control circuit comprises means for requesting said host arbitration control circuit to acquire control of said host system bus.

8. A system according to claim 7 wherein said host arbitration control circuit comprises means for indicating to said subsystem arbitration control circuit that control of said host system bus has been acquired.

9. A system according to claim 6 wherein said means for comparing includes a look up table for storing said subsystem busmaster priority values to be compared with said host busmaster device priority value.

* * * * *

UNITED STATES PATENT AND TRADEMARK OFFICE
CERTIFICATE OF CORRECTION

PATENT NO. : 5,377,331
DATED : December 27, 1994
INVENTOR(S) : Bernard C. Drerup and James C. Peterson It is certified that error appears in the above-indentified patent and that said Letters Patent is hereby corrected as shown below:

Col. 12, line 18, delete "on", insert --onto--.

Signed and Sealed this

Twentieth Day of August, 1996

Attest:

BRUCE LEHMAN

Attesting Officer     Commissioner of Patents and Trademarks